(12) United States Patent
Banak et al.

(10) Patent No.: US 10,483,757 B1
(45) Date of Patent: Nov. 19, 2019

(54) FAST-ACTING POWER PROTECTION SYSTEM INCORPORATING DISCRETE MOSFETS AND CONTROL IC ON HYBRID SUBSTRATES AND METHOD OF OPERATING THEREOF

(71) Applicant: Manufacturing Networks Incorporated (MNI), Santa Clara, CA (US)

(72) Inventors: Michael Alan Banak, Oak Lawn, IL (US); Vallangiman Venkataraman Srinivasan, San Francisco, CA (US)

(73) Assignee: Manufacturing Networks Incorporated (MNI), Santa Clara, CA (US)

( * ) Notice: Subject to any disclaimer, the term of this patent is extended or adjusted under 35 U.S.C. 154(b) by 0 days.

(21) Appl. No.: 16/133,706

(22) Filed: Sep. 18, 2018

(51) Int. Cl.
*H02H 9/02* (2006.01)
*H02H 11/00* (2006.01)
*H02H 9/04* (2006.01)

(52) U.S. Cl.
CPC ............ *H02H 9/025* (2013.01); *H02H 9/04* (2013.01); *H02H 11/003* (2013.01)

(58) Field of Classification Search
CPC ........... H02H 9/025; H02H 9/04; H02H 1/003
USPC ...................................................... 361/93.9
See application file for complete search history.

(56) References Cited

U.S. PATENT DOCUMENTS

| 8,537,517 B1 * | 9/2013 | Banak .................. H02H 11/002 361/93.1 |
| 10,164,424 B2 * | 12/2018 | Koh ........................ H02H 9/044 |
| 2003/0076638 A1 * | 4/2003 | Simonelli ............... G05F 1/571 361/56 |
| 2012/0026636 A1 * | 2/2012 | Chai ........................ H02H 9/001 361/93.9 |

* cited by examiner

*Primary Examiner* — Dharti H Patel
(74) *Attorney, Agent, or Firm* — Invent Capture, LLC.; Samuel S. Cho (57) ABSTRACT

A fast-acting power protection system and a related method of power protection are disclosed. The fast-acting power protection system includes a current limiting block capable of reducing or blocking an unwanted current or voltage surge at an input terminal of the fast-acting power protection system. The fast-acting power protection system can include an NMOS-based power switch unit, a current-limiting block control unit, and an NMOS-based active Zener clamp, which may be separated or combined on hybrid substrates of a single semiconductor package for improved design and manufacturing scalability, cost efficiency, and reliability. Depending on design preferences, the NMOS-based active Zener clamp may be integrated into the current-limiting block control unit or remain separate. The fast-acting power protection system protects an electrical device connected to an output terminal of the fast-acting power protection system from an unwanted voltage surge by rapidly clamping an output voltage to a clamp voltage.

17 Claims, 7 Drawing Sheets

| | Vzener (V) | | | IZt(1) (A) | I_HOLD @ 20°C (A) | Operating Current | | RTyp (Ω) |
|---|---|---|---|---|---|---|---|---|
| Min. | Typ. | Max. | | | | Test Voltage | Max Current (mA) | |
| 5.7 | 5.8 | 6.0 | 0.1 | 1.3 | 5.0 | 0.50 | 0.12 |

| RMax (Ω) (Over the Product Life) | TYPICAL PROTECTION THRESHOLDS | | I/V FLT MAX | | Tripped Power Dissipation Max | |
|---|---|---|---|---|---|---|
| | Current / Voltage | Hysteresis Current / Voltage | Current | Voltage | (A) | Test Voltage |
| 0.15 | 1.5A / 5.5V | 50mA / 50mV | +6 A –N/A* | +24V -20V | 1.0 | 24 |

1) Izt is the current at which Vzener is measured.

2) Typical operating current is 0.50 mA @ 5.0V Test Voltage, which meets USB suspend mode requirement.

FIG. 7B

FAST-ACTING POWER PROTECTION SYSTEM INCORPORATING DISCRETE MOSFETS AND CONTROL IC ON HYBRID SUBSTRATES AND METHOD OF OPERATING THEREOF

BACKGROUND OF THE INVENTION

The present invention generally relates to power protection systems for electrical devices. More specifically, the present invention relates to one or more embodiments of a novel fast-acting power protection system that incorporates a discrete MOSFET as a power switch unit and a current-limiting block control unit in hybrid substrates. The present invention also relates to a method for protecting an electrical device against voltage/current surges or reverse polarity input connections.

Many electrical devices today operate in environments susceptible to unwanted and dangerous power surges or accidental reverse polarity input connections. If power surges (i.e. involving a voltage surge, a current surge, or both) are sufficiently high or prolonged beyond a negligible duration, electrical devices subject to power surges can sustain operation failure or permanent damages. Therefore, protection against power surges have been commonly addressed by conventional fuses with thermal or magnetic elements, which are designed to cut off incoming electrical power.

One example of a conventional fuse is a polymeric positive temperature coefficient (PPTC) device, which exhibits a high inherent resistance than a metallic fuse or a circuit breaker. Therefore, while PPTC's are used in applications where slow power protection responses are acceptable, they are often undesirable in electronic circuits which require fast power protection responses and high energy efficiencies. Relays have been also incorporated in some electrical systems to block current or voltage surges bidirectionally. Furthermore, a transient blocking unit (TBU) is also used to protect sensitive electrical circuits which require higher performance parameters than what can be satisfied with conventional fuses or relays.

Earlier designs for transient blocking units (TBU's) were unable to perform a reset in case of a short-lived transient power surge event, thereby inconveniencing device users. Furthermore, most TBU designs are generally incapable of protecting electrical circuits if a power surge event is sufficiently prolonged (i.e. non-transient). Newer TBU designs, such as a design disclosed by U.S. Pat. No. 7,576,962, incorporates a reset feature as an effort to provide more control for surge event protection.

In most of the conventional power protection system designs, including conventional fuses, relays, and TBU's, it is difficult to achieve a fast, stiff, and durable surge protection responses. Because conventional power protection system designs tend to involve at least some slow-response components such as polymer-based devices, a reduction or a shut-down of over-current and/or over-voltage event is often slower than desirable. Furthermore, conventional power protections also typically suffer from fatigue and incremental degradation in protection performances over time.

Accordingly, a novel power protection system and a related method, which provide a rapid and reliable voltage, current, and reverse polarity protection, may be advantageous. Furthermore, a novel power protection system and a related method, which enable a lower footprint and a lower energy consumption by reducing or eliminating discrete package polymers in a protection circuit, may also be advantageous.

Moreover, a novel power protection system and a related method, which utilize hybrid substrates to combine or separate at least one of a current-limiting control IC component, a MOSFET-based power switch component, and a voltage clamp component within a single semiconductor package, may also be advantageous for achieving design and manufacturing scalability, cost efficiency, and reliability.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a method of protecting an electrical device from a power surge is disclosed. This method comprises the steps of: connecting an input terminal of a fast-acting power protector to an electrical source, wherein the fast-acting power protector incorporates a current-limiting block control unit as a universal control IC core chip mounted on a first hybrid substrate, an NMOS-based power switch unit mounted on a separate second hybrid substrate, and an output voltage clamp either integrated into the universal control IC core chip or connected to the universal control IC core chip as a separate unit, wherein the current-limiting block control unit and the NMOS-based power switch unit constitute a current limiting block; connecting an output terminal of the fast-acting power protector to the electrical device for power surge protection; and determining whether an incoming electrical current multiplied by a sense resistor value (Rsense) is approximately equal to a surge protection trigger voltage (Vos) for a current trip.

Furthermore, if the incoming electrical current multiplied by the sense resistor value (Rsense) is approximately equal to the surge protection trigger voltage (Vos) for the current trip, this method utilizes at least one MOSFET and optionally at least one reverse-protection diode in the current limiting block to reduce or shut down the incoming electrical current as a current or voltage surge protection; and if a voltage coming out of the current limiting block is surging higher than a clamp output voltage of the output voltage clamp at the output terminal of the fast-acting power protector, the method holds down the voltage coming out of the current limiting block to the clamp output voltage at the output terminal to the clamp output voltage of the output voltage clamp as a voltage surge protection of the electrical device connected to the output terminal of the fast-acting power protector.

Moreover, in another embodiment of the invention, a fast-acting power protector system for an electrical device is disclosed. This fast-acting power protector system comprises: an input terminal configured to receive an incoming electrical current and voltage; an output terminal configured to transmit an outgoing electrical current and voltage; a current limiting block comprising a current-limiting block control unit as a universal control IC core chip mounted on a first hybrid substrate, and an NMOS-based power switch unit mounted on a separate second hybrid substrate, wherein the current limiting block further includes at least one MOSFET configured to reduce or shut down an incoming electrical current into the input terminal in case of a current trip event, wherein the current limiting block also optionally includes an additional MOSFET for reverse polarity protection; and an output voltage clamp configured to clamp an output voltage at the output terminal to a clamp voltage value if the output voltage begins to surge above the clamp voltage value or another voltage surge protection threshold value, wherein the output voltage clamp is either integrated into the universal control IC core chip or connected to the universal control IC core chip as a separate unit.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble a novel power protection system for an electrical device and/or a related method of protecting an electrical device using the novel power protection system. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "power surge" is defined as a spike in voltage, current, or both. An example of a power surge is a voltage or current spike at an input terminal of an electrical device caused by an external power source, an external electrical signal, or a sudden change in environment such as lightening or storm.

Furthermore, for the purpose of describing the invention, a term "current limiting block" is defined as a protective electrical circuit configured to limit an output current coming out of the electrical circuit if an input of the protective electrical circuit experiences a power surge (i.e. a current surge and/or a voltage surge). In a preferred embodiment of the invention, the current limiting block comprises enhancement-mode MOSFET's (metal oxide semiconductor field effect transistor) connected in series with a common drain, and one or more optional Schottky diodes for blockage of current through additional control MOSFET's to protect against a reverse polarity event. This current limiting block is able to drastically reduce or shut down a spiking current after a detection of a power surge.

In addition, for the purpose of describing the invention, a term "output voltage clamp" is defined as an electrical unit configured to clamp an output voltage to a clamp voltage value at an output terminal of a fast-acting power protector system to protect an electrical device connected to the output terminal, if an unwanted voltage surge is detected. In a preferred embodiment of the invention, the output voltage clamp is an NMOS-based active Zener diode, which may be an integrated component into a current-limiting block control unit, or a discrete component in a combined semiconductor package comprising the fast-acting power protection system. In the preferred embodiment of the invention, a Zener voltage, or a Zener breakdown voltage, of the Zener diode is the clamp voltage value. In another embodiment of the invention, the output voltage clamp is a compound device that performs a voltage clamping function. If the compound device is the output voltage clamp instead of a Zener diode, one advantage may be having a less current leakage than a typical Zener diode in a low Zener voltage application (e.g. Vz<5.6V).

Moreover, for the purpose of describing the invention, a term "current trip" is defined as an act of drastically reducing or shutting down an incoming current or a surging current for power protection of an electrical device.

One aspect of an embodiment of the present invention is providing a novel power protection system which rapidly lowers or shuts down a surging input current, while minimizing current leak to an electrical device protected by the novel power protection system.

Another aspect of an embodiment of the present invention is providing a fast, stiff, and durable output voltage clamping at an output terminal of the novel power protection system during a power surge, without fatigue and incremental resistance aging issues experienced by conventional polymeric positive temperature coefficient (PPTC) devices.

Yet another aspect of an embodiment of the present invention is providing a small-footprint, energy-efficient, fast-acting, and multi-component hybrid substrate-based novel power protection system that improves scalability, cost efficiency, and reliability over conventional power protection packages.

In addition, another aspect of an embodiment of the present invention is providing a novel method of rapidly reducing or shutting down an incoming electrical current and clamping an output voltage to a clamp voltage during an undesirable power surge.

Furthermore, another aspect of an embodiment of the present invention is providing a fault-interrupt mode and/or a self-recovery mode as reset options for a novel power protection system.

Figure 1:
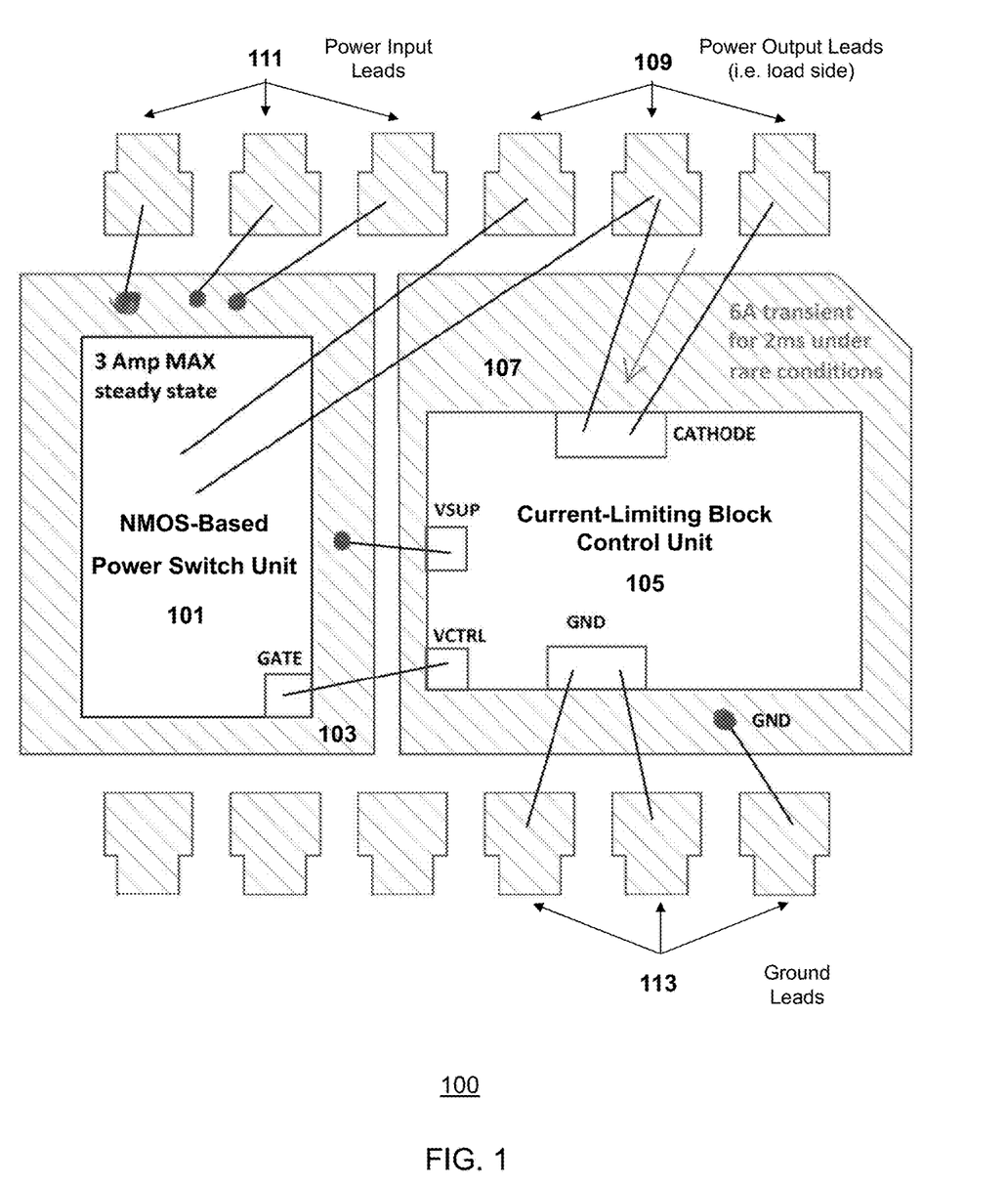
FIG. 1 shows a first hybrid substrate embodiment of a fast-acting power protection system that separates an NMOS-based power switch unit and a current-limiting block control unit with an integrated voltage clamp, in accordance with an embodiment of the invention.

FIG. 1 shows a first hybrid substrate embodiment (100) of a fast-acting power protection system that separates an NMOS-based power switch unit (101) and a current-limiting block control unit (105) with an integrated output voltage clamp, in accordance with an embodiment of the invention. As shown in FIG. 1, the current-limiting block control unit (105) is configured to detect and block an unusual direct current (DC) surge from power input leads (111) into the current-limiting block control unit (105) and the NMOS-based power switch unit (101). In the first hybrid substrate embodiment (100) of the fast-acting power protection system, the integrated output voltage clamp incorporated into the current-limiting block control unit (105) is an NMOS-based active Zener clamp.

Under typical operating conditions not involving a current surge event from connected circuits, one or more dual-bond leads (109) connected to a cathode of the current-limiting block control unit (105) carry no electrical current in steady state. Furthermore, in a preferred embodiment of the invention, the current-limiting block control unit (105) typically performs its power protection control functions with less than 5 mA of direct current (DC) in steady state operations. If a DC surge occurs, the one or more dual-bond leads (109) are able to withstand up 6A for approximately 2 milliseconds, while the current-limiting block control unit (105) sends a switch-off signal from its VCTRL pad to a gate pad in the NMOS-based power switch unit (101) to turn off the power outflow to power output leads (109), as shown in FIG. 1.

Furthermore, in one embodiment of the invention, the current-limiting block control unit (105) includes a voltage supply (VSUP) pad, which is operatively connected to a hybrid substrate (103) of the NMOS-based power switch unit (101) to receive or transmit voltage supply between the hybrid substrate (103) of the NMOS-based power switch unit (101) and the current-limiting block control unit (105). In addition, the current-limiting block control unit (105) also includes a ground pad (GND) that connects the current-limiting block control unit (105) to ground leads (113).

In the first hybrid substrate embodiment (100) of the fast-acting power protection system as shown in FIG. 1, the NMOS-based power switch unit (101) is configured to receive a DC current up to 3 A into NMOS drain pads connected to one or more power input leads (111). Likewise, the NMOS-based power switch unit (101) is also configured to transmit the DC current up to 3 A from NMOS source pads connected to the power output leads (109). In other embodiments of the invention, the maximum input current and/or the maximum output current for the NMOS-based power switch unit (101) may be set at higher or lower values, depending on desirable circuit protection parameters for a particular electrical system design.

Importantly, the first hybrid substrate embodiment (100) of the fast-acting power protection system may be built on "composite" hybrid substrates that include both conductive and insulating areas. For example, mounting headers utilized to mount silicon chips within the fast-acting power protection system package may be at least partly electrically conductive for design implementation simplification, footprint efficiency, cost reduction, and reliability. As shown in FIG. 1, the power switch unit's (101) hybrid substrate (103) has electrically-conductive mounting header areas that provide electrical connections directly from the source pads to the power input leads (111), and voltage supply connections from the electrically-conductive mounting header areas to the VSUP pad of the current-limiting block control unit (105), as shown in FIG. 1. In contrast, the center area of the hybrid substrate (103) that contacts the surface of the power switch unit (101) may be largely electrically insulated to avoid short-circuiting the power switch unit (101) itself. Similarly, as also shown in FIG. 1, the current-limiting block control unit's (105) hybrid substrate (107) may optionally include electrically-conductive mounting header areas that provide electrical connections directly from the ground pads to the ground leads (113). The hybrid substrates, as disclosed in the first hybrid substrate embodiment (100), also enable an optimal thermal protection for a universal control core IC (e.g. 105) from overheating by allowing a circuit designer to place a carefully-calculated separation between an often-heated power switch unit (e.g. 101) and the universal control core IC (e.g. 105) within a single package. The center area of the current-limiting block control unit's (105) hybrid substrate (107) that contacts the surface of the current-limiting block control unit (105) may be largely electrically insulated to avoid short-circuiting the current-limiting block control unit (105) itself. In other embodiments of the invention, the fast-acting power protection system may utilize a non-composite and entirely electrically-insulated hybrid substrate (e.g. ceramic, alumina, etc.) as mounting headers.

As shown in the first hybrid substrate embodiment (100) of the fast-acting power protection system, by separating the current-limiting block control unit (105) from the NMOS-based power switch unit (101) while utilizing composite hybrid substrates to place both units in a single semiconductor package, significant reductions on design footprints and design and manufacturing costs can be achieved. In particular, the standardization of the current-limiting block control unit (105) as a separate universal control IC core chip that can be conveniently "dropped into" a single system package, which also incorporates a particular NMOS-based power switch unit catering to a customer-specific power protection design requirement, can save time and design and manufacturing costs in various power protection system designs.

Furthermore, the standardization of the current-limiting block control unit (105) as a separate universal IC core chip, which may also be mask-programmable, makes various power protection system designs scalable and flexible. For example, by utilizing the separate universal IC core chip as a current-limiting controller, a power MOSFET can be tailored and targeted for several different applications without incurring significant current-limiting controller IC redesign efforts and time.

Figure 2:
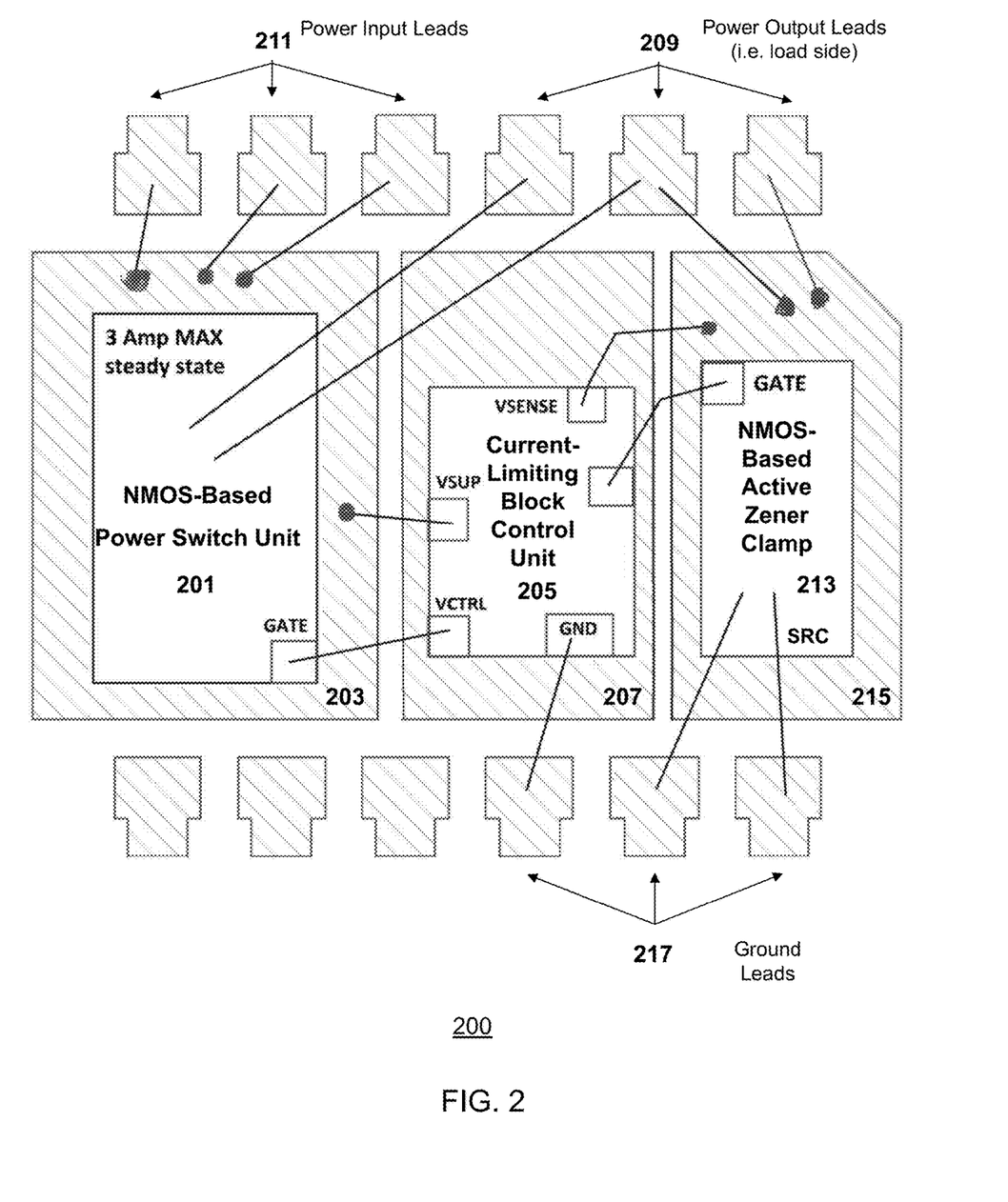
FIG. 2 shows a second hybrid substrate embodiment of a fast-acting power protection system that separates an NMOS-based power switch unit, a current-limiting block control unit, and a voltage clamp, in accordance with an embodiment of the invention.

FIG. 2 shows a second hybrid substrate embodiment (200) of a fast-acting power protection system that separates an NMOS-based power switch unit (201), a current-limiting block control unit (205), and an output voltage clamp (213), in accordance with an embodiment of the invention. As shown in FIG. 2, the current-limiting block control unit (205) is configured to detect an unusual direct current (DC) surge from a power input received by a VSENSE pad from an electrically-conductive composite hybrid substrate (215) that mounts the output voltage clamp (213), which is external to the current-limiting block control unit (205). If the usual DC surge above a threshold value is detected via the VSENSE pad, then the current-limiting block control unit (205) activates the output voltage clamp (213) to protect any circuits connected to the fast-acting power protection system by rapidly clamping the output voltage and dramatically reducing the current flow.

Furthermore, in the second hybrid substrate embodiment (200) as shown in FIG. 2, the output voltage clamp (213) is an NMOS-based active Zener clamp, which is separated from other units and mounted on its own electrically-conductive composite hybrid substrate (215). The output voltage clamp (213) receives a control signal to its gate pad from the current-limiting block control unit (205), and also connected to at least some power output leads (209), as shown in FIG. 2. The output voltage clamp (213) is also connected to the ground leads (217) from its ground pads, as shown in the second hybrid substrate embodiment (200).

One or more dual-bond leads (209) are connected to the electrically-conductive composite hybrid substrate (215) of the NMOS-based active Zener clamp (213) and drain pads on the NMOS-based power switch unit (201).

Furthermore, in a preferred embodiment of the invention, the current-limiting block control unit (205) typically performs its power protection control functions with less than 5 mA of direct current (DC) in steady state operations. If a DC surge occurs, the one or more dual-bond leads (209) are able to withstand up 6A for approximately 2 milliseconds, while the current-limiting block control unit (205), after detecting the DC surge via the VSENSE pad, sends a switch-off signal from its VCTRL pad to a gate pad in the NMOS-based power switch unit (201) to turn off the power outflow to power output leads (209), as shown in FIG. 2.

Furthermore, in one embodiment of the invention, the current-limiting block control unit (205) includes a voltage supply (VSUP) pad, which is operatively connected to a hybrid substrate (203) of the NMOS-based power switch unit (201) to receive or transmit voltage supply between the hybrid substrate (203) on the NMOS-based power switch unit (201) and the current-limiting block control unit (205). In addition, the current-limiting block control unit (205) also includes a ground pad (GND) that connects the current-limiting block control unit (205) to ground leads (217).

In the second hybrid substrate embodiment (200) of the fast-acting power protection system as shown in FIG. 2, the NMOS-based power switch unit (201) is configured to receive a DC current up to 3 A into NMOS drain pads connected to one or more power input leads (211). Likewise, the NMOS-based power switch unit (201) is also configured to transmit the DC current up to 3 A from NMOS source pads connected to the power input leads (211). In other embodiments of the invention, the maximum input current and/or the maximum output current for the NMOS-based power switch unit (201) may be set at higher or lower values, depending on desirable circuit protection parameters for a particular electrical system design.

Importantly, the second hybrid substrate embodiment (200) of the fast-acting power protection system may be built on "composite" hybrid substrates that include both conductive and insulating areas. For example, mounting headers utilized to mount silicon chips within the fast-acting power protection system package may be at least partly electrically conductive for design implementation simplification, footprint efficiency, cost reduction, and reliability. As shown in FIG. 2, the power switch unit's (201) hybrid substrate (203) has electrically-conductive mounting header areas that provide electrical connections directly from the source pads to the power input leads (211), and voltage supply connections from the electrically-conductive mounting header areas to the VSUP pad of the current-limiting block control unit (205), as shown in FIG. 2. Similarly, as also shown in FIG. 2, the current-limiting block control unit's (205) hybrid substrate (207) or the output voltage clamp's (213) hybrid substrate (215) may optionally include electrically-conductive mounting header areas that provide electrical connections directly from some power output leads (209) to at least one of the hybrid substrates (207 or 215). The hybrid substrates (203, 207, 215), as disclosed in the second hybrid substrate embodiment (200), also enable an optimal thermal protection for a universal control core IC (e.g. 205) from overheating by allowing a circuit designer to place carefully-calculated separations among the often-heated power switch unit (e.g. 201), the universal control core IC (e.g. 205), and the output voltage clamp (e.g. 213) within a single package. In other embodiments of the invention, the fast-acting power protection system may utilize a non-composite and entirely electrically-insulated hybrid substrate (e.g. ceramic, alumina, etc.) as mounting headers.

As shown in the second hybrid substrate embodiment (200) of the fast-acting power protection system, by separating the current-limiting block control unit (205) and the output voltage clamp (213) from the NMOS-based power switch unit (201) while utilizing composite hybrid substrates to place all three units in a single semiconductor package, significant reductions on design footprints and design and manufacturing costs can be achieved. In particular, the standardization of the current-limiting block control unit (205) as a separate universal control IC core chip that can be conveniently "dropped into" a single system package, which also incorporates a particular NMOS-based power switch unit catering to a customer-specific power protection design requirement, can save time and design and manufacturing costs in various power protection system designs.

Furthermore, the standardization of the current-limiting block control unit (205) as a separate universal IC core chip, which may also be mask-programmable, makes various power protection system designs scalable and flexible. For example, by utilizing the separate universal IC core chip as a current-limiting controller, a power MOSFET can be tailored and targeted for several different applications without incurring significant current-limiting controller IC redesign efforts and time.

Figure 3:
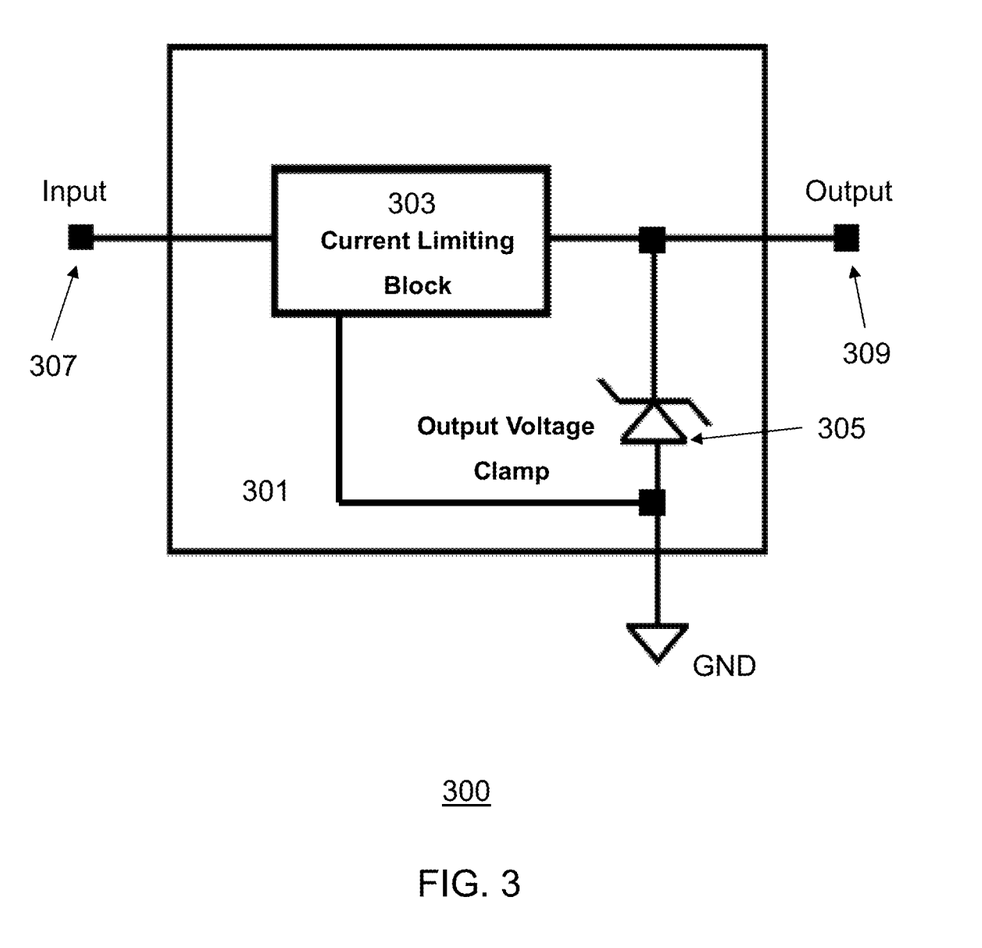
FIG. 3 shows a high-level block diagram of a fast-acting power protection system in accordance with an embodiment of the invention.

FIG. 3 shows a high-level block diagram (300) of a fast-acting power protection system (301) in accordance with an embodiment of the invention. In a preferred embodiment of the invention, the fast-acting power protection system comprises a current limiting block (303) and an output voltage clamp (305), which may utilize composite or entirely electrically-insulating hybrid substrates as mounting headers within a single semiconductor package Continuing with FIG. 3, in the preferred embodiment of the invention, the current limiting block (303) at least comprises a plurality of common-drain series MOSFET's operating in enhancement modes, which reduce or shut down an incoming electrical current into the input terminal in case of a current trip event. The current trip event may occur if there is an unwanted power surge or a dangerous reverse polarity voltage inputs at an input terminal (307) of the fast-acting power protector system.

In one embodiment of the invention, the current limiting block (303) further comprises a first op-amp comparator and a sense resistor ($R_{sense}$) to trigger the current trip event, if the incoming electrical current multiplied by a resistance value of the sense resistor ($R_{sense}$) is approximately equal to the surge protection trigger voltage (Vos). Furthermore, in one embodiment of the invention, the current limiting block (303) also includes a flip-flop with a set (S) input operatively connected to the first op-amp comparator, a reset (R) input operatively connected to a reset logic, and an output (Q) operatively connected to one or more MOSFET's configured to reduce or shut down the incoming electrical current into the input terminal in case of the current trip event. The reset logic may have a second op-amp comparator which compares an input voltage and a targeted reset threshold voltage and outputs a reset enable signal if the input voltage falls below the targeted reset threshold voltage. In addition, the current limiting block (303) further comprises one or more Schottky diodes operatively connected to the plurality of common-drain series MOSFET's, wherein the one or more Schottky diodes protect any MOSFET's from reverse current in a reverse input polarity event. The current limiting block (303) is able to reduce or shut down the incoming electrical current into the input terminal in case of the current trip event.

Continuing with FIG. 3, in the preferred embodiment of the invention, the output voltage clamp (305) is a Zener diode voltage clamp operatively connected to an output terminal (309) of the fast-acting power protector system. In another embodiment of the invention, the output voltage clamp (305) is a compound device that performs a voltage clamping function. In the preferred embodiment of the invention, the output voltage clamp (305) is configured to hold down or "clamp" the voltage coming out of the current limiting block (303) to a Zener voltage of the Zener diode voltage clamp (e.g. 305) at the output terminal (309) as a voltage surge protection of an electrical device connected to the output terminal (309), if an unwanted power surge occurs at an input terminal (307). Furthermore, in the preferred embodiment of the invention, the Zener diode voltage clamp (e.g. 305) is referenced to ground (GND) and provides a fast and durable voltage surge protection to the electrical device. In one embodiment of the invention, voltage clamping to a certain clamp voltage value (e.g. a Zener voltage) is triggered if the output voltage begins to surge above the clamp voltage value or another voltage surge protection threshold value.

Figure 4:
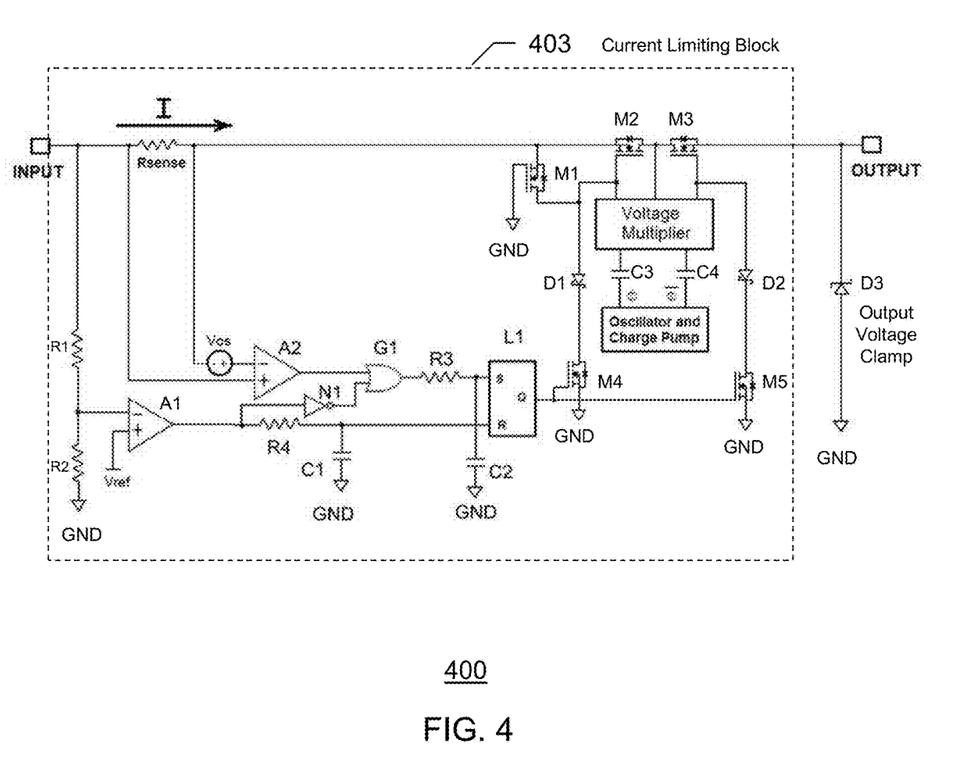
FIG. 4 shows an example of a detailed schematic of a current limiting block and a voltage clamping device in accordance with an embodiment of the invention.

FIG. 4 shows an example of a detailed schematic (400) of a current limiting block (403) and a voltage clamping device (D3) in accordance with an embodiment of the invention. In a preferred embodiment of the invention, the current limiting block (403) at least comprises a plurality of common-drain series MOSFET's (e.g. M2, M3) operating in enhancement modes, which reduce or shut down an incoming electrical current into the input terminal (INPUT) in case of a current trip event, which may occur if there is an unwanted power surge or a dangerous reverse polarity voltage inputs at the input terminal (INPUT) of the fast-acting power protector system.

Moreover, in one embodiment of the invention, the plurality of common-drain series MOSFET's (e.g. M2, M3) is also operatively connected to an additional MOSFET (M1) with its gate grounded (GND) for input polarity reversal protection. Furthermore, in one embodiment of the invention, the plurality of common-drain series MOSFET's (e.g. M2, M3) and/or the additional MOSFET (M1) can also be operatively connected to a Voltage Multiplier which is operatively connected through one or more capacitors (e.g. C3, C4) and an Oscillator and Charge Pump unit for effective current reduction in case of a current trip event. In addition, the plurality of common-drain series MOSFET's (e.g. M2, M3) and/or the additional MOSFET (M1) may also be operatively connected through one or more reverse-protection Schottky diodes (e.g. D1, D2) which are further connected to other grounded MOSFET's (e.g. M4, M5) for a rapid and durable shut down of currents in case of a current trip event. In some embodiments of the invention, a single MOSFET (e.g. M2 or M3) may be utilized, instead of the plurality of MOSFET's (e.g. M2 and M3), in the detailed schematic (400) to provide a unidirectional current-limiting protection only. Yet in other embodiments of the invention, the utilization of more than one MOSFET's (e.g. M2, M3) may provide bidirectional current-limiting protections.

In one embodiment of the invention, the current limiting block (403) further comprises a first op-amp comparator (A2) and a sense resistor ($R_{sense}$) to trigger the current trip event, if the incoming electrical current (I) multiplied by a resistance value of the sense resistor ($R_{sense}$) is approximately equal to the surge protection trigger voltage (Vos). In addition, the output of the first op-amp comparator (A2) may also be operatively connected through a delay circuit comprising an additional resistor (R3) and a capacitor (C2) coupled to the ground to prevent nuisance responses. Furthermore, in one embodiment of the invention, the current limiting block (403) also includes a flip-flop (L1) with a set (S) input operatively connected to the first op-amp comparator (A2), a reset (R) input operatively connected to a reset logic, and an output (Q) operatively connected to one or more MOSFET's configured to reduce or shut down the incoming electrical current into the input terminal in case of the current trip event. In one example, the set (S) input has priority, thus necessitating removal of the fault condition before reset for the flip-flop (L1).

In a preferred embodiment of the invention, the reset logic may have a second op-amp comparator (A1) which compares an input voltage and a targeted reset threshold voltage (e.g. $V_{ref}$) and outputs a reset enable signal if the input voltage falls below the targeted reset threshold voltage. Furthermore, the output of the second op-amp comparator (A1) may also be operatively connected to a delay circuit comprising an additional resistor (R4) and a capacitor (C1) coupled to the ground to tailor the recovery time (e.g. controlling nuisance responses). In one embodiment of the invention, the input voltage signal (e.g. an over-voltage signal) may also be operatively connected through an inverse gate (N1) and an input of a two-terminal OR gate (G1), which is connected to the set (S) input of the flip-flop (L1). In one embodiment, the delay circuit can be implemented in clocked logic and can also be tailored on any path for attack and release time to eliminate, for example, nuisance responses.

Furthermore, in one embodiment of the invention, the input voltage signal (e.g. an over-voltage signal) may be operatively connected from the second op-amp comparator (A1) through the inverse gate (N1) and the input of the two-terminal OR gate (G1), which is connected to the set (S) input of the flip-flop (L1). In a preferred embodiment of the invention, the reset logic depends on the overvoltage op-amp comparator (A1), which compares an input voltage and a targeted reset threshold voltage (E.g. Vref plus some hysteresis) and outputs a reset enable signal, if the input voltage falls below the targeted reset threshold voltage.

Furthermore, the output of the second op-amp comparator (A1) may also be operatively connected through the delay circuit comprising an additional resistor (R4) and a capacitor (C1) coupled to the ground to tailor the recovery time (e.g. controlling nuisance responses).

In a fault interrupt mode for operating the fast-acting power protection system after a current trip event, if the input voltage into the input terminal (INPUT) falls below the targeted reset threshold voltage (e.g. $V_{ref}$), the fast-acting power protection system may be reset to a normal operation mode prior to the current trip event for passing input voltage and current at the input terminal (INPUT) to the output terminal (OUTPUT). In the preferred embodiment of the invention, as illustrated in FIG. 4, the current trip event (i.e. alternatively called a "fault state") does not clear and reset to the normal operation mode until V(INPUT)×alpha falls below $V_{ref}$ value, wherein alpha=R2/(R1+R2). In another embodiment of the invention, the fast-acting power protection system may operate in a self-recovery mode, which involves a step of resuming the normal operation mode, or a flow of an incoming electrical current from the input terminal (INPUT) to the output terminal (OUTPUT) of the fast-acting power protection after a set period of time, if the current and/or voltage surge protection or the current trip event were triggered previously.

Moreover, in one embodiment of the invention, when the current is blocked by the current limiter, the current fault is eliminated. With no fault at-play, after a prespecified delay time, the fast-acting power protection system will attempt to self-recover, but only if there is no overvoltage fault. On the one hand, if the self-recovery conditions are met, the fast-acting power protection system will be activated again, which in turn allows the electrical current to flow from the input terminals to the load-side output terminals. On the other hand, if the self-recovery conditions are not satisfied (i.e. the causes of the original fault persists), then the fast-acting power protection system will enter another current fault state. As long as the cause of the high-current condition exists without an overvoltage fault, the system will repetitively attempt reactivations until the causes of the fault are removed.

Continuing with FIG. 4, in the preferred embodiment of the invention, the output voltage clamp (D3) is a low-resistance Zener diode voltage clamp referenced to the ground (GND) and is also operatively connected to the output terminal (OUTPUT) of the fast-acting power protector system. In another embodiment of the invention, the output voltage clamp (D3) is a compound device that performs a voltage clamping function. In the preferred embodiment of the invention, the output voltage clamp (D3) is configured to hold down or "clamp" the voltage coming out of the current limiting block (403) to a Zener voltage (e.g. 5.6 V Zener breakdown) of the Zener diode voltage clamp (D3) at the output terminal (OUTPUT) as a voltage surge protection of an electrical device connected to the output terminal (OUTPUT), if an unwanted power surge occurs at the input terminal (INPUT). Furthermore, in the preferred embodiment of the invention, the Zener diode voltage clamp (e.g. D3) is referenced to ground (GND) and provides a fast and durable voltage surge protection to the electrical device. In one embodiment of the invention, voltage clamping to a certain clamp voltage value (e.g. a Zener voltage) is triggered if the output voltage begins to surge above the clamp voltage value or another voltage surge protection threshold value.

Furthermore, in one embodiment of the invention, the detailed schematic (400) of the current limiting block (403) and the voltage clamping device (D3) can be described as a method of protecting an electrical device from a power surge, which comprises following steps:

a) connecting an input terminal (INPUT) of a fast-acting power protector to an electrical source, wherein the fast-acting power protector comprises a MOSFET (i.e. M1) for reverse polarity protection from other MOSFET's (i.e. M2, M3) for blocking forward current surges to prevent latchup and high-current forwarding biasing in a current limiting block (403), and wherein a Zener diode voltage clamp (D3) and a current limiting block (403) are represented by a combination of a current-limiting block control unit, an NMOS-based power switch unit, and an NMOS-based active Zener clamp.

b) connecting an output terminal of the fast-acting power protector to the electrical device for power surge protection;

c) determining whether an incoming electrical current multiplied by a sense resistor value (Rsense) is approximately equal to a surge protection trigger voltage (Vos) for a current trip;

If the incoming electrical current multiplied by the sense resistor value ($R_{sense}$) is approximately equal to the surge protection trigger voltage ($V_{os}$) for the current trip, then the fast-acting power protector uses at least one pair of common-drain series MOSFET's (e.g. M2, M3) and at least one reverse-protection Schottky diode (e.g. D1, D2) in the current limiting block (403) to reduce or shut down the incoming electrical current as a current and/or voltage surge protection. Furthermore, if a voltage coming out of the current limiting block (403) is surging higher than a Zener voltage of the Zener diode voltage clamp (D3) at the output terminal (OUTPUT) of the fast-acting power protector, then the fast-acting power protector can hold down the voltage coming out of the current limiting block (403) to the Zener voltage to clamp voltage at the output terminal (OUTPUT) to the Zener voltage of the Zener diode voltage clamp (D3) as a voltage surge protection of the electrical device connected to the output terminal of the fast-acting power protector.

In addition, the method of protecting an electrical device from a power surge as described above can further comprise a step of blocking the incoming electrical current inside the current limiting block (403) using an additional MOSFET (M1) if an input polarity at the input terminal of the fast-acting power protector is reversed or reverse-biased relative to a correct input polarity. The additional MOSFET (M1) may detect a polarity reversal across its gate-source nodes, and upon detection of the polarity reversal, the additional MOSFET (M1) turns on, thereby holding off nearby MOSFET (e.g. M2) and blocking any reverse high currents.

Moreover, this power protection method can also add a step of allowing the incoming electrical current to follow uninterrupted from the input terminal to the output terminal of the fast-acting power protector, if the incoming electrical current multiplied by the sense resistor value ($R_{sense}$) is less than the surge protection trigger voltage ($V_{os}$) for the current trip and if the voltage coming out of the current limiting block (403) is not higher than the Zener voltage of the Zener diode voltage clamp (D3) at the output terminal of the fast-acting power protector.

Figure 5:
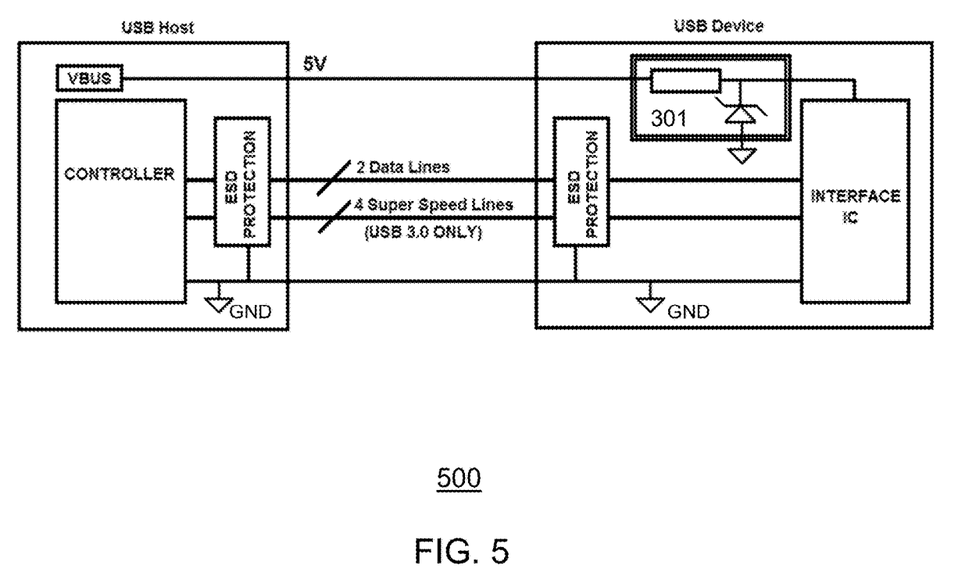
FIG. 5 shows an example of an application involving a fast-acting power protection system integrated into a USB device in accordance with an embodiment of the invention.

FIG. 5 shows an example of an application (500) involving a fast-acting power protection system (501) integrated into a USB device in accordance with an embodiment of the invention. In this application (500), the fast-acting power protection system (501) is sufficiently miniaturized to be integrated into a USB device, which may also includes an Interface IC (i.e. an example of an electrical device connected to the output terminal of the fast-acting power protection system) and an electrostatic discharge (ESD) protection block. Examples of USB devices include, but are not limited to, a USB flash drive, a USB wireless communication modem, or another USB standard-compliant device. Examples of USB standards include, but are not limited to, USB 1.0, 2.0, and 3.0 standards. In the preferred embodiment of the invention, the fast-acting power protection system (501) comprises a singularly-packaged and hybrid substrate-based multi-component current limiting block (e.g. 303 in FIG. 3, 403 in FIG. 4) and an output voltage clamp (e.g. 305 in FIG. 3, D3 in FIG. 4), which meet a USB suspend mode current requirement of 200 micro-amps current at 5.0V operating voltage under a normal mode of operation.

As shown in FIG. 5, a voltage bus (VBUS) from a USB host (e.g. a computer with a USB port) may supply an incoming electrical voltage (5V) and a corresponding incoming electrical current into an input terminal of the fast-acting power protector system (501). Under a normal operating mode, the fast-acting power protector system (501) largely carries the incoming electrical voltage and the corresponding incoming electrical current to the Interface IC via an output terminal of the fast-acting power protector system (501). In case of a power surge event, the fast-acting power protection system (501) uses a current limiting block (e.g. 403) and an output voltage clamp (e.g. D3) for rapid and stiff current limiting and voltage clamping as described for FIG. 1 and FIG. 2. Furthermore, various parts of the current limiting block and the output voltage clamp inside the fast-acting power protection system (501) are grounded for efficient current limiting and voltage clamping in a power surge event.

Figure 6:
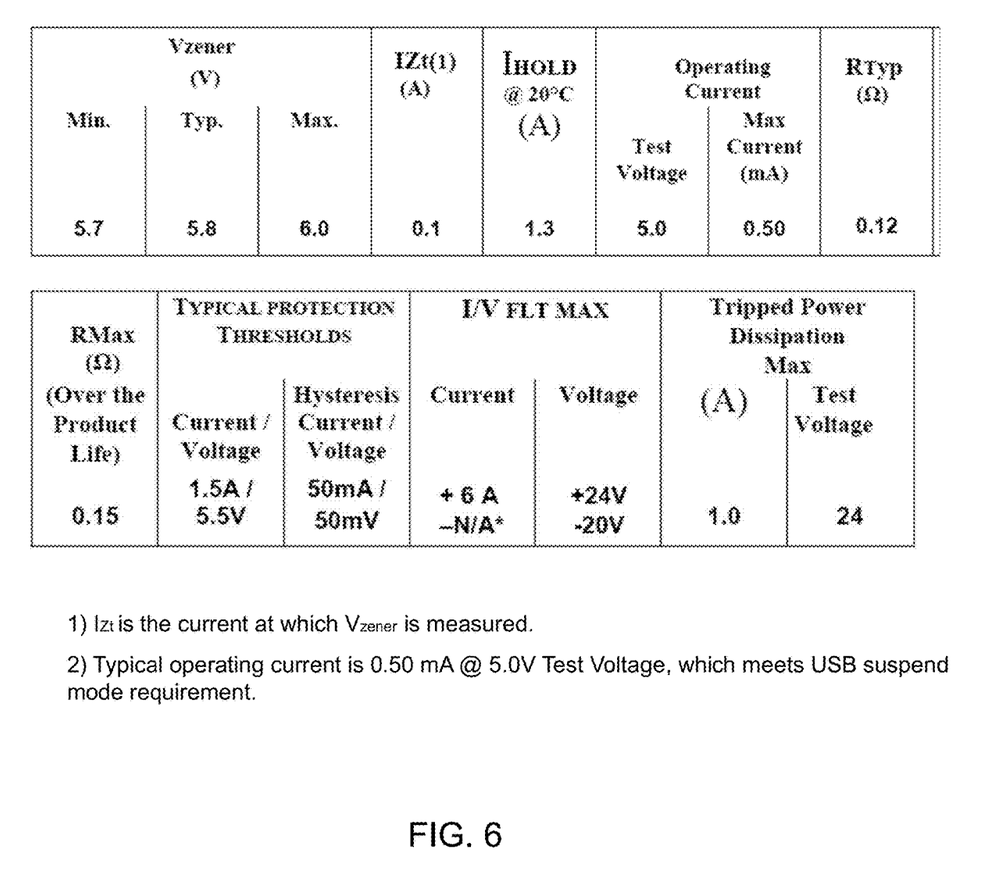
FIG. 6 shows an example of electrical characteristics for a fast-acting power protection system in accordance with an embodiment of the invention.

FIG. 6 shows an example of electrical characteristics for a fast-acting power protection system for a particular test condition in accordance with an embodiment of the invention. In this embodiment of the invention, a typical Zener voltage for a Zener diode as an output voltage clamp is 5.9 V, with a minimum Zener voltage value of 5.8V and a maximum Zener voltage value of 6.0V under a test current value ($Iz_t$) of 0.1 amps. The test condition also uses an operating current of 500 micro-amps at 5 V, which meets the USB suspend mode requirement.

Figure 7A:
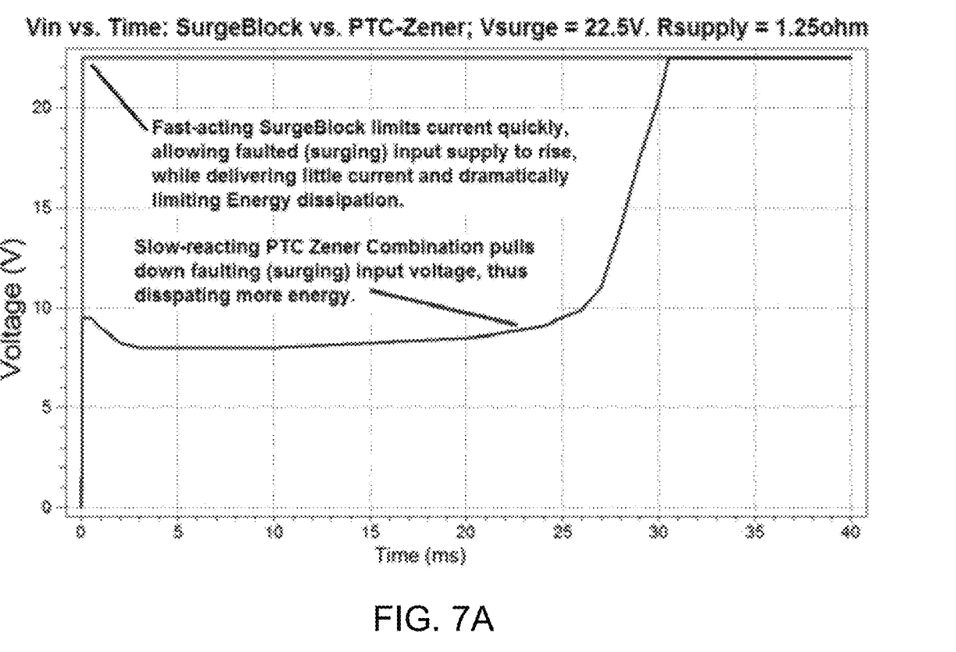
FIG. 7A shows an example of a fault response ($V_{in}$ vs. Time) under a particular test condition for a fast-acting power protection system called "SurgeBlock" in accordance with an embodiment of the invention vs. a conventional PPTC-Zener combination at a surge voltage of 22.5 V and a supply resistance value of 1.25 ohms.

FIG. 7A shows an example of a fault response ($V_{in}$ vs. Time) under a particular test condition for a fast-acting power protection system called "SurgeBlock" in accordance with an embodiment of the invention vs. a conventional PPTC-Zener combination at a surge voltage of 22.5 V and a supply resistance value of 1.25 ohms. As shown in FIG. 7A, the fast-acting power protection system rapidly limits current (relative to time measured in milli-seconds) and allows surging $V_{in}$ to rise while transmitting little current and dramatically limiting energy dissipation. It should be noted that $V_{out}$ will also be clamped to a clamp voltage (e.g. a Zener voltage) of an output voltage clamp (e.g. a Zener diode), thereby protecting an electrical device at the output terminal of the fast-acting power protection system by achieving both current reduction or shut-down and voltage clamping. In contrast, the conventional PPTC-Zener combination pulls down the surging input voltage for an extended period of time (i.e. approximately for 25 milli-seconds under this particular test condition), which dissipates more energy and potentially reduces durability of components.

Figure 7B:
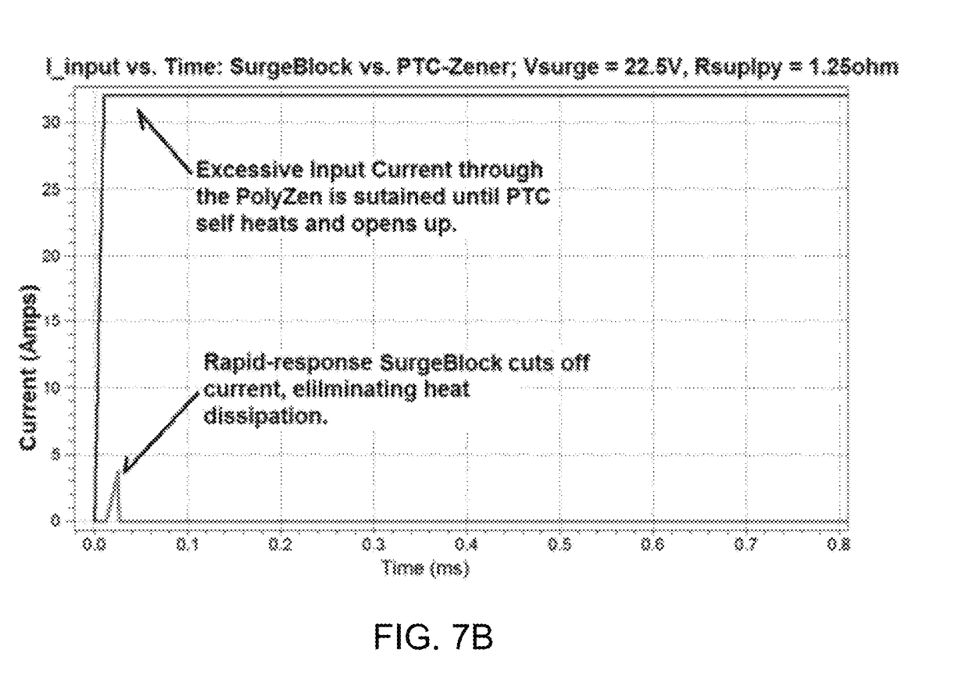
FIG. 7B shows an example of an input current (I_input) vs. time characteristics under a particular test condition for a fast-acting power protection system in accordance with an embodiment of the invention vs. a conventional PPTC-Zener combination at a surge voltage of 22.5 V and a supply resistance value of 1.25 ohms.

FIG. 7B shows an example of an input current (I_input) vs. time characteristics under a particular test condition for a fast-acting power protection system in accordance with an embodiment of the invention vs. a conventional PPTC-Zener combination at a surge voltage of 22.5 V and a supply resistance value of 1.25 ohms. As shown in FIG. 7B, the fast-acting power protection system rapidly shuts down current, thereby minimizing heat (i.e. surge energy) dissipation. In contrast, the conventional PPTC-Zener combination is unable to reduce current in an acceptable amount of time, and allows excessive input current until the PPTC itself is heated up to reduce current, which is beyond the time scale of this graph on the horizontal axis.

One or more embodiments of the power protection system and the related method has been illustrated in FIGS. 1~7B and described above. The present invention provides numerous advantages over conventional power protection designs. For example, one or more embodiments of the present invention uniquely enables fast, durable, and energy-efficient current trip and output voltage clamping by utilizing an NMOS-based power switch unit controlled by a current-limiting block control unit implemented on hybrid substrates of a singular semiconductor package. By separating the current-limiting block control unit from the NMOS-based power switch unit while utilizing composite hybrid substrates to place both units in a single semiconductor package, significant reductions on design footprints and design and manufacturing costs can be achieved.

In particular, the standardization of the current-limiting block control unit as a separate universal control IC core chip that can be conveniently "dropped into" a single system package, which also incorporates a particular NMOS-based power switch unit catering to a customer-specific power protection design requirement, can save time and design and manufacturing costs in various power protection system designs.

Furthermore, the standardization of the current-limiting block control unit as a separate universal IC core chip, which may also be mask-programmable, makes various power protection system designs scalable and flexible. For example, by utilizing the separate universal IC core chip as a current-limiting controller, a power MOSFET can be tailored and targeted for several different applications without incurring significant current-limiting controller IC redesign efforts and time.

Moreover, one or more embodiments of the present invention also provides an advantage of providing a scalable small-footprint power protection system which can be incorporated or integrated into a microelectronics device such as a USB device, as illustrated in FIG. 5. In addition, another advantage of the present invention is providing one or more flexible reset modes from a current trip or an overvoltage output voltage clamping in a power protection system, which may operate under a fault-interrupt mode or a self-recovery mode as a reset option for a novel power protection system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of protecting an electrical device from a power surge, the method comprising the steps of:
   connecting an input terminal of a fast-acting power protector to an electrical source, wherein the fast-acting power protector incorporates a current-limiting block control unit as a universal control IC core chip mounted on a first hybrid substrate, an NMOS-based power switch unit mounted on a separate second hybrid substrate, and an output voltage clamp either integrated into the universal control IC core chip or connected to the universal control IC core chip as a separate unit, wherein the current-limiting block control unit and the NMOS-based power switch unit constitute a current limiting block;

connecting an output terminal of the fast-acting power protector to the electrical device for power surge protection;

determining whether an incoming electrical current multiplied by a sense resistor value ($R_{sense}$) is approximately equal to a surge protection trigger voltage ($V_{os}$) for a current trip;

if the incoming electrical current multiplied by the sense resistor value ($R_{sense}$) is approximately equal to the surge protection trigger voltage ($V_{os}$) for the current trip:
   using at least one MOSFET and optionally at least one reverse-protection diode in the current limiting block to reduce or shut down the incoming electrical current as a current or voltage surge protection; and if a voltage coming out of the current limiting block is surging higher than a clamp output voltage of the output voltage clamp at the output terminal of the fast-acting power protector:
   holding down the voltage coming out of the current limiting block to the clamp output voltage at the output terminal to the clamp output voltage of the output voltage clamp as a voltage surge protection of the electrical device connected to the output terminal of the fast-acting power protector.

2. The method of claim 1, wherein the first hybrid substrate mounting the current-limiting block control unit comprises an electrically-conductive area and an electrically-insulating area that constitute partly electrically-conductive and partly electrically-insulating "composite" mounting headers for the current-limiting block control unit.

3. The method of claim 1, wherein the separate second hybrid substrate mounting the NMOS-based power switch unit comprises an electrically-conductive area and an electrically-insulating area that constitute partly electrically-conductive and partly electrically-insulating "composite" mounting headers for the NMOS-based power switch unit.

4. The method of claim 1, further comprising the step of blocking the incoming electrical current inside the current limiting block using the MOSFET for reverse polarity protection inside the current limiting block, if an input polarity at the input terminal of the fast-acting power protector is reversed or reverse-biased relative to a correct input polarity.

5. The method of claim 1, further comprising the step of allowing the incoming electrical current to follow uninterrupted from the input terminal to the output terminal of the fast-acting power protector, if the incoming electrical current multiplied by the sense resistor value ($R_{sense}$) is less than the surge protection trigger voltage ($V_{os}$) for the current trip and if the voltage coming out of the current limiting block is not higher than the clamp output voltage of the output voltage clamp at the output terminal of the fast-acting power protector.

6. The method of claim 1, further comprising the step of resetting the fast-acting power protector to stop blocking the incoming electrical current, if a fault condition is removed and if an input voltage into the input terminal of the fast-acting power protector falls below a targeted reset threshold.

7. The method of claim 1, further comprising the step of resuming a flow of the incoming electrical current from the input terminal to the output terminal of the fast-acting power protector after a set period of time, if the current or voltage surge protection were triggered previously.

8. The method of claim 1, wherein the output voltage clamp is a Zener diode-based clamp or a clamp made of active devices, and wherein the clamp output voltage is a Zener voltage of the Zener diode-based clamp or a reference-based voltage of the clamp made of active devices.

9. A fast-acting power protector system for an electrical device, the fast-acting power protector system comprising:
   an input terminal configured to receive an incoming electrical current and voltage;
   an output terminal configured to transmit an outgoing electrical current and voltage;
   a current limiting block comprising a current-limiting block control unit as a universal control IC core chip mounted on a first hybrid substrate, and an NMOS-based power switch unit mounted on a separate second hybrid substrate, wherein the current limiting block further includes at least one MOSFET configured to reduce or shut down an incoming electrical current into the input terminal in case of a current trip event, wherein the current limiting block also optionally includes an additional MOSFET for reverse polarity protection; and
   an output voltage clamp configured to clamp an output voltage at the output terminal to a clamp voltage value if the output voltage begins to surge above the clamp voltage value or another voltage surge protection threshold value, wherein the output voltage clamp is either integrated into the universal control IC core chip or connected to the universal control IC core chip as a separate unit.

10. The fast-acting power protector system of claim 9, wherein the first hybrid substrate mounting the current-limiting block control unit comprises an electrically-conductive area and an electrically-insulating area that constitute partly electrically-conductive and partly electrically-insulating "composite" mounting headers for the current-limiting block control unit.

11. The fast-acting power protector system of claim 9, wherein the separate second hybrid substrate mounting the NMOS-based power switch unit comprises an electrically-conductive area and an electrically-insulating area that constitute partly electrically-conductive and partly electrically-insulating "composite" mounting headers for the NMOS-based power switch unit.

12. The fast-acting power protector system of claim 9, wherein the output voltage clamp is a Zener diode referenced to ground or a clamp made of active devices, and wherein the clamp voltage value is a Zener voltage of the Zener diode or a reference-based voltage of the clamp made of active devices.

13. The fast-acting power protector system of claim 9, wherein the current limiting block further comprises a first op-amp comparator and a sense resistor ($R_{sense}$) to trigger the current trip event, if the incoming electrical current multiplied by a resistance value of the sense resistor ($R_{sense}$) is approximately equal to the surge protection trigger voltage ($V_{os}$).

14. The fast-acting power protector system of claim 13, wherein the current limiting block further comprises a flip-flop with a set (S) input operatively connected to the first op-amp comparator, a reset (R) input operatively connected to a reset logic, and an output (Q) operatively connected to one or more MOSFET's configured to reduce or shut down the incoming electrical current into the input terminal in case of the current trip event.

15. The fast-acting power protector system of claim 14, wherein the reset logic comprises a second op-amp comparator which compares an input voltage and a targeted reset threshold voltage and outputs a reset enable signal if the input voltage falls below the targeted reset threshold voltage.

16. The fast-acting power protector system of claim 9, wherein the current limiting block further comprises one or more reverse-protection Schottky diodes operatively connected to at least one MOSFET for reducing or shutting down the incoming electrical current into the input terminal in case of the current trip event.

17. The fast-acting power protector system of claim 14, wherein the one or more MOSFET's configured to reduce or shut down the incoming electrical current into the input terminal in case of the current trip event are also operatively connected to one or more Schottky diodes which are operatively connected to at least one MOSFET.

* * * * *